INVENTOR.
CONRAD HEIMANN
BY
Woodhams, Blanchard & Flynn
ATTORNEYS

Nov. 24, 1970           C. HEIMANN          3,543,183
APPARATUS FOR THE DEVELOPMENT OF A COHERENT
MONOCHROMATIC LIGHT BEAM
Filed Feb. 7, 1966                         5 Sheets—Sheet 2
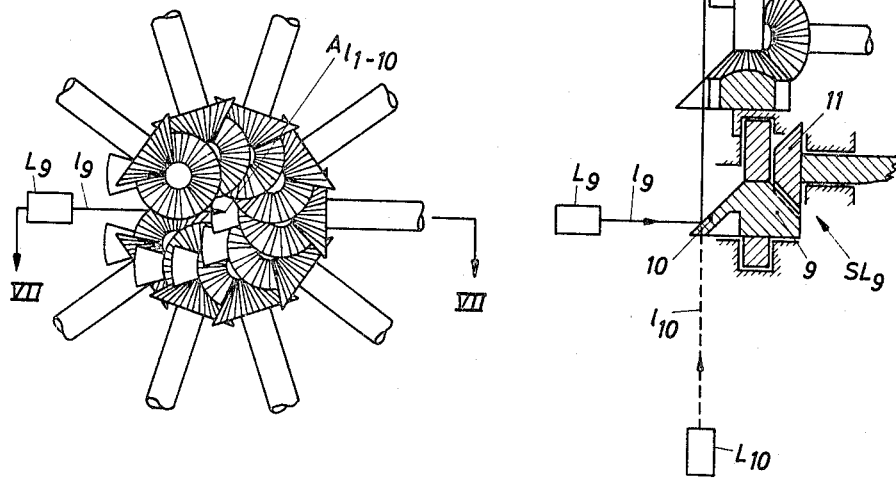
INVENTOR.
CONRAD HEIMANN
BY
ATTORNEYS United States Patent Office 3,543,183
Patented Nov. 24, 1970

3,543,183
APPARATUS FOR THE DEVELOPMENT OF A COHERENT MONOCHROMATIC LIGHT BEAM
Conrad Heimann, Bad Godesberg, Germany, assignor to Ringsdorf-Werke GmbH, Bad Godesberg-Mehlem, Germany, a corporation of Germany
Filed Feb. 7, 1966, Ser. No. 525,657
Claims priority, application Germany, June 23, 1965, R 40,930
Int. Cl. H01s 3/02
U.S. Cl. 331—94.5
9 Claims

ABSTRACT OF THE DISCLOSURE

An apparatus for producing coherent monochromatic light in at least one common output beam wherein two or more lasers are arranged to emit output pulses in sequence and utilizing at least one control device arranged to periodically move into and out of the light path of an associated laser. The control device, while in the light path of the associated laser, always has the same orientation to the common output beam irrespective of the instantaneous position thereof. The output pulse of the other lasers are directed along the common output beam whenever the light path of the associated laser is not interrupted by the control device.

The invention relates to an apparatus for producing a coherent, monochromatic radiation of light in the form of at least one strongly focused output beam in which the light beam is produced in a light amplifying unit in which a selective fluorescent medium, with which an optional arrangement of pulsing devices is associated, can be excited by means of an excitation light source for pulsed sending of a single beam of light.

Under the term "light amplifying unit" all those instruments are understood to be included which generally are called "lasers" and which are understood to be optical senders or amplifiers. In said instruments, a selectively fluorescent medium, for instance a liquid or a gas or a suitably doped monocrystal, glass or plastic, is brought to fluorescence. A beam of light is then produced from the medium by an optical arrangement of resonators, which beam consists of coherent, monochromatic, strongly focused light.

The known instruments for producing a coherent, monochromatic radiation of light involve the use of only one light amplifying unit. The single beam of light, being sent by said light amplifying unit, is identical with the output beam of the apparatus. As is known in light amplifying units of the described type, the energy received by the selectively fluorescent medium is much higher than the energy which is discharged into the beam of light. The difference is converted into heat, which warms the selectively fluorescent medium. To obtain a useable energy in the output beam, it is therefore necessary to cool the light amplifying unit intensively, especially the selectively fluorescent medium. The apparatus requirement for this is very large. Nevertheless, the pulse frequency of the known apparatus must be appreciably lower as the power becomes higher in the output beam. The selectively fluorescent medium must have sufficient time for cooling off between the single pulses. Said low pulse frequency restricts the possibilities of use of the known apparatus considerably or excludes same in some cases completely.

The basic purpose of the invention is to provide an instrument of the type described foregoing, which provides a high power valve in the output beam at any desired high frequency even including a pulse frequency approaching continuity. This is accomplished by providing two or more light amplifying units which are combined into one instrument and are controlled in a way that the pulses of the single beams of light are in an alternating pulse relationship to each other so that a beam control device is required which is synchronous with the pulse frequency of the single beam of light and which is movable with at least one component of movement transversely to the output beam and which is associated with the single beams in a way that all single beam pulses leave the apparatus in the direction of the output beam.

The basic thought of the invention is to combine a number of light amplifying units into one instrument and to project out of the instrument in a common path its alternating single beams of light so that in spite of a high pulse frequency in the output beam, the selectively fluorescent media of the signal light amplifying units are energized only very slowly for sending of pulses so that they heat up only temporarily. By this means, it is possible to essentially increase the pulse frequency in comparison to the pulse frequency in known apparatus, up to a continuous sending of power in the output beam. Consequently, new scopes of use are accessible to instruments for producing coherent, monochromatic radiations of strongly focused light, which had previously been impractical because of a small pulse frequency or of a too small output power. Furthermore, the apparatus required for cooling can be substantially reduced.

The light amplifying units can be controlled in a way that the pulses of the single beams of light follow each other in the output beam in time-measured intervals. The output beam will then have a pulse characteristic, the frequency of which can be determined as desired by selecting appropriately the number of light amplifying units utilized in a given apparatus.

The light amplifying units can also be controlled so that the pulses of the single beams of light follow each other directly in the output beam. A quasi-continuous radiation results of this and shows variations in intensity.

Finally it is possible to control the light pulses in a way that the pulses of the light segments in the output beam are overlapping each other. By this means the intensity of radiation can be accurately controlled. Thereby the leading and trailing edges of the pulse can be chopped off so that the output beam consists of only the peak power of the pulses of the light segments and consequently results in a very high powered beam of light being produced.

According to a useful further construction of the invention, there is provided an optical reflection device which is movable synchronously with the frequency of the pulses of the light segments by means of which the overlapping parts of the pulses of single beams of light are reflectable to a light amplifying unit that emits its light pulse at a later time for use as an additional excitation light for the respective light amplifying units. The chopped off portions of the pulses of the single beams of light are used in this case as the source for the additional excitation radiation for a light amplifying unit.

It is an advantage that the control device of the beam be provided with at least one surface of reflection which is inclined towards the output beam and to the source of the single beam of light and which is arranged to a transversely driving support for rotation extending across a limited part of said periphery in a way that said surface of reflection moves through the output beam device during rotation. In this case, the control device for the beams consists of rotatable parts only and, therefore, same is especially easy to control.

Each surface of reflection can be flat. This makes its production easy but permits only pulses in the output beam having chronical intervals in between the pulses.

That is, the flat surface of reflection cannot move while it reflects the pulse of the single beam of light in direction to the output beam and a certain amount of time is required to move the surface of reflection to the path of the single beam of light and the output beam and to move same out of the way again.

Therefore, each reflective surface is preferably built as a partial surface of a body of rotation, such as a cone. Reflective surfaces of this kind can be moved during reflection without the beam moving from the desired direction. Therefore, if an output beam comprising a sequence of pulses without intervals therebetween is desired, or an overlapping of pulses in the output beam is desired, the reflective surfaces must conform to the surface of a body of rotation. Successive reflective surfaces in the form of surfaces of rotation can be easily introduced at the point of intersection of two single beams, the pulses in the one beam overlapping those in the other. The trailing reflective surface in such case interrupts the first single beam clipping the trailing portion of its pulses, while reflecting the second single beam into the path of the output beam. The leading portion of the pulses in the second single beam are thus also clipped and the output beam is being constituted by a continuous succession of non-overlapping pulses.

Advantageously, the light amplifying units, with maybe one exception, are arranged in a step-like fashion in planes which are transverse of the direction of the output beam. The control apparatus for the light beams consists of a plurality of rotatably driveable devices, each positioned respectively in said planes, and each respectively carrying a reflective surface and moving same through the output beam upon the rotation of said devices. Because of the step-like arrangement of the light amplifying units and of the supports in one instrument, any desired number of light amplifying units can be provided.

An essentially small over-all length can be attained if the light amplifying units are arranged spiral-like around the axis of the output beam. The staggering of light amplifying units in different planes is thus combined with a circular arrangement around the output beam so that the instrument is essentially shorter than it would be if all of such units would be staggered vertically.

Another possibility of construction, which leads to a very compact construction of the apparatus would be that the light amplifying units are arranged in a way that the single beams of light merge together at one focal point and that the control apparatus comprises a disk for rotation which is provided at its periphery with reflective surfaces which are differentially inclined to the axis of rotation and which pass through the focal point during rotation of the disk. The inclinations of the reflective surfaces are arranged with the differential directions of incidence of the single beam of light to the focal point in such a way that all single beams of light leave the apparatus using one path. Here the control apparatus is one single rotatable disk and therefore, a small and easy construction is achieved.

Furthermore, it is also possible to arrange two light amplifying units in a way that they send out single beams of light traveling oppositely to each other and that the control apparatus is a round disk having reflective surfaces arranged tooth-like around its periphery and being alternately inclined, which surfaces pass through the light beams during rotation of the disk. In such case, many reflective surfaces can be arranged around the periphery of the disk for each one of the two single beams of light and thereby permit the frequency of rotations of the disk to be reduced.

Within the apparatus of an invention, two or more output beams can be produced in the same fashion. At least two light amplifying units are required for each output beam and the control apparatus belongs commonly to all groups of light amplifying units and the output beams. The above-described control apparatus can be used in this case very well, said device being provided with pairs of light amplifying units being vertically opposite each other on the periphery of the toothed disk. This causes the output beams to travel out of the apparatus into all directions radially to the disk.

Examples of construction of the invention are shown schematically in the drawings:

FIG. 6 is a top view of a further embodiment comprising 10 lasers.

FIG. 7 is a sectional view taken along the line VII—VII in FIG. 6.

Figure 2A:
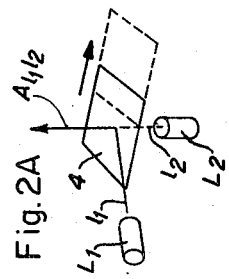
FIG. 2A is a view of an apparatus similar to FIGS. 1 and 2 only showing a reciprocatory reflective surface.
Figure 2:
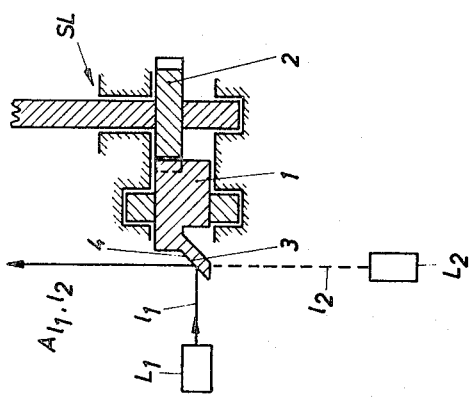
FIG. 2 is a cross-sectional view along line II—II of an apparatus of the invention with two lasers.
Figure 1:
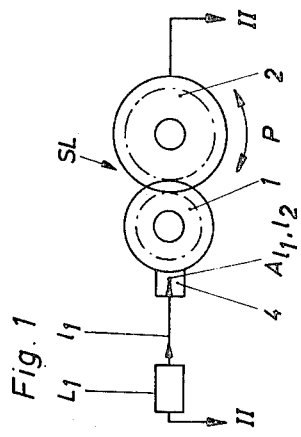
FIG. 1 is a top view of a light amplifying unit and control apparatus.

The examples of construction in FIGS. 1 and 2 provide two light amplifying units and are shown schematically by the references $L_1$ and $L_2$. Each of said light amplifying units, including those which will be mentioned later, includes a selectively fluorescent medium which can be energized for the intermittent sending of single segments of light by means of an excitation light source and of an optical arrangement of resonators. The details of such a light amplifying unit do not have to be discussed because they are known laser techniques.

Figure 10:
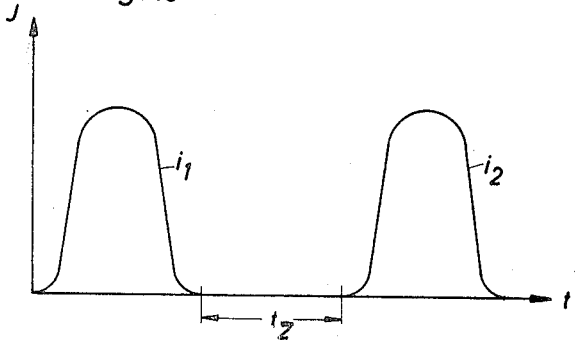
FIGS. 10–12 are representing curves showing the different possible forms of the output beam.

Each light amplifying unit sends out a single beam of light $l_1$ or $l_2$. Both light amplifying units $L_1$ and $L_2$ are controlled by suitable movement of their excitation light sources in such a way that the pulses of the single beams of light $l_1$ and $l_2$ are in alternating pulsed relationship to each other. SL generally represents a control apparatus and is provided with a support rotatably mounted and with a drive wheel 2 for driving same for rotation. Support 1 is provided with an optical reflection device 3 which consists, according to the example in FIGS. 1 and 2, of a reflective surface 4 which is planar or arcuate, a partial surface of a body of rotation preferably of a cone, and extends along a part of the periphery of the support 1. The light amplifying units $L_1$ and $L_2$ and the inclination of the reflective surface 4 and also its path of movement during the rotation of the support 1 are related to each other so that the reflective surface 4 alternates back and forth to alternately block the single beam $l_2$ and reflect the single beam $l_1$. Such motion is shown in FIG. 1 by the double arrow P and such movement is in accordance with the frequency of the pulses of the light beams $l_1$ and $l_2$. The surface of reflection is always moving but is intermittently stopped in the cast of a flat surface of reflection. When the surface of reflection 4 (FIG. 2A) is moved in the plane thereof the surface of reflection does not need to be intermittently stopped, for the light emitted by the laser axially aligned with the common output beam can enter the common output beam when the reflecting surface 4 is moved laterally thereof to the broken line position. When the surface of reflection 4 is outside of the paths of the two single beams of light $l_1$, $l_2$, then the light amplifying unit $L_2$ sends out a pulse of light. Thus, an output beam $A_{1_1, 1_2}$ is formed by means of a series of pulses of light from both light amplifying units $L_1$ and $L_2$. A diagrammatic representation of the pulses of light formed is shown in FIG. 10 wherein $t$ represents the time axis, $j$ represents the support axis of the impulses, $i_1$ is a pulse of light of the light amplifying unit $L_1$ and $i_2$ is a pulse of light of the light amplifying unit $L_2$. The two pulses $i_1$ and $i_2$ follow each other by an interval $t_z$ which is needed to move the flat surface of reflection 4 into and out of the path of the two single beams of light $l_1$ and $l_2$ without deflection of said beams from the direction of the output beam.

Figure 3:
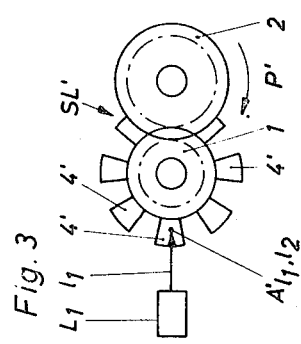
FIG. 3 is a top view on an apparatus similar to FIGS. 1 and 2 only showing a different control apparatus.
Figure 11:
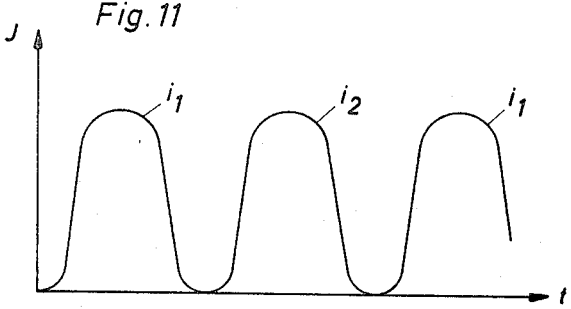

The construction shown in FIG. 3 differs from the example shown in FIGS. 1 and 2 in that it comprises a different control device for the beams marked as SL'. In the example of construction, the same parts have the same marks of reference. According to the example of construction in FIG. 3, several surfaces of reflection 4 are arranged on the support 1 and extend with intervals across a part of the periphery of the support 1. The support 1 is turned, as shown by the arrow P', in one direction of rotation so that the surfaces of reflection 4' alternately block the path of the single beam of light $l_2$ and reflect the pulses of the single beam of light $l_1$. Consequently the pulse frequency of the output beam $A'_{l_1, l_2}$ can be increased so that a series of pulses, as shown in FIG. 11, is reached in which the single pulses $i_1$ and $i_2$ follow each other without appreciable intervals. Furthermore, the speed of operation of the support 1 can be reduced in comparison to the construction of FIGS. 1 and 2.

Figure 5:
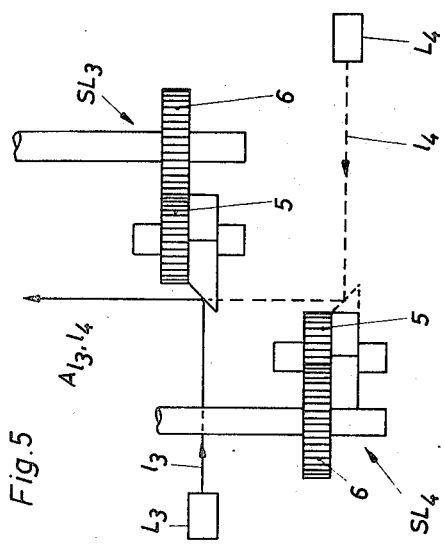
FIG. 5 is a side elevational view of the embodiment shown in FIG. 4.
Figure 4:
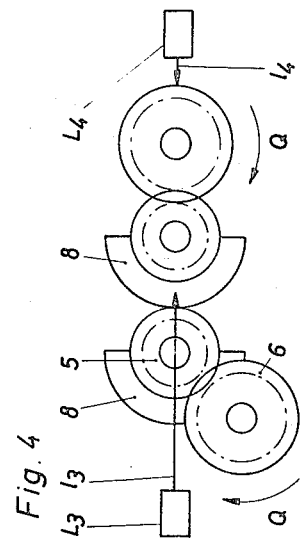
FIG. 4 is a top view of an embodiment comprising two lasers.
Figure 12:
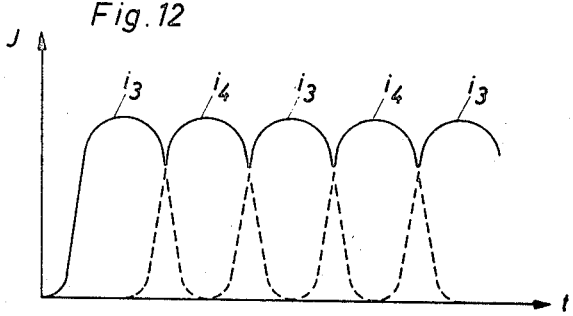

According to the construction of FIGS. 4 and 5, two light amplifying units $L_3$ and $L_4$ are arranged in parallel spaced planes facing towards each other and send pulses of single beams of light $l_3$ and $l_4$. The control device for the beams consists of two components $SL_3$ and $SL_4$ which are identical with respect to each other. Each component is composed of a rotatable support 5 and of a driving gear 6. Each support 5 is provided with a surface of reflection 8 upon a part of its periphery, said surface of reflection forming the surface of a conical shell. Rotation of support 5 follows the direction of arrow Q and is synchronized with the frequency of the pulses of the single beams of light $l_3$ and $l_4$. The surfaces of reflection 8 are inclined such that they direct the single beams of light $l_3$ and $l_4$ into a common output beam $A_{l_3, l_4}$. Since the surfaces of reflection, according to the construction in FIGS. 4 and 5, are parts of a surface of a body of rotation, they can be moved during reflection. It is therefore possible to overlap the alternating pulses of the single beams of light $l_3$, $l_4$. A pulse of light has the wave form as indicated in FIG. 12, the single pulses being indicated by $i_3$ and $i_4$.

The overlapped sections can be reflected by an extra (not shown) device and can be used as an excitation light for the light amplifying units.

The number of light amplifying units can be increased selectively as desired. The construction of FIGS. 6 and 7 is developed out of the construction of FIGS. 4 and 5. Ten light amplifying units are provided in this embodiment, however, only two of said light amplifying units are shown and they are $L_9$ and $L_{10}$. All light amplifying units send alternately pulsed single beams of light toward one another. The light amplifying unit $L_{10}$ sends its single beam of light $l_{10}$ in the direction of beam $A_{l_{1-10}}$. The remaining light amplifying units are arranged in parallel planes around the path of the output beam. Each of the ast-mentioned light amplifying units is provided with a partial unit for the deflection of a beam whereby said partial units together form the control device of the beam. The partial units are constructed identically so that it is sufficient to described only one partial unit $SL_9$. $SL_9$ is provided with a support 9 rotatably positioned and which is provided with a cone-like surface of reflection 10 across a part of its periphery. The cone-shaped support 9 is rotatably driven by a cone-shaped driving wheel 11 whereby said rotation is synchronized to the frequency of the pulses of the light beam $l_9$. As clearly shown by FIGS. 6 and 7, the partial units assigned to the light amplifying units are again arranged spiral-like around the path of the output beam $A_{l_{1-10}}$.

The following numerical example explains, according to FIGS. 6 and 7, how the apparatus can be used.

A knowledge is assumed of the light amplifying unit for pulse working of a pulse-laser-radar with 1 megawatt maximum power output noted by H.D. Stein in the monthly paper "The Armed Forces," 60th annual publication, issue 8, page 309. Said light amplifying unit works with a pulse frequency of 200 pulses per second. The time between applying the stimulation pulse to the start of the generated pulse is assumed as being 400 $\mu s$. (microsecond). The discharge time is assumed, for instance, as being 500 $\mu s$.

The apparatus has ten different optical light amplifying units which are arranged in a spiral-like fashion so that the spiral describes a complete circle. The light amplifying units are out of phase by 36° toward each other. Their output beams are directed concentrically towards the axis of the spiral.

The first light amplifying unit sends out a pulse in the single beam of light belonging thereto in a time period of 500 $\mu s$. The second unit receives its stimulation pulse 100 $\mu s$. after the start of the pulse of the first light amplifying unit so that same starts sending off a pulse at the same moment when the pulse of the first light amplifying unit ends. Through these means a quasi-continuous radiation is accomplished in the output beam where one pulse of the first light amplifying unit ends. Through these means a quasi-continuous radiation is accomplished in the output beam where one pulse is followed by the next pulse without any time intervals therebetween.

With these times each amplifying unit has a stimulation and radiation time of 900 $\mu s$. and a cooling time of 4100 $\mu s$. Consequently, between the start of the discharge of an optical light amplifier, used commonly in the apparatus, and the next following discharge of the same light amplifier is a time of 5 ms. The reflective surface belonging to the light amplifying unit has to rotate at 12,000 r.p.m. in this example. The stimulation sources of light for the light amplifying unit are controlled so that the stimulation pulse is released when the leading edge of the rotational surface of reflection 10 is 28.8° away from the axis of the spiral in which the light amplifying units are arranged. The pulse being produced by the light amplifying unit starts the moment when the leading edge of the reflective surface reaches the axis of the spiral.

An overlapping of 100 $\mu s$. for each one of the pulses in the output beam can be accomplished within the scope of this example if the apparatus is arranged so that at the beginning of the pulse of one optical light amplifying unit, such as one lasting for 500 $\mu s$., the stimulation source for a second optical light amplifying unit starts to send out a stimulation pulse. Thus, the second unit starts to send out a stimulation pulse. Thus, the second unit starts to emit its generated light 100 $\mu s$. before the end of the generated pulse of the first unit. The rotating reflective surface should be so adjusted that it starts to reflect the generated light of the second unit 50 $\mu s$. after the beginning of the pulse.

Figure 8:
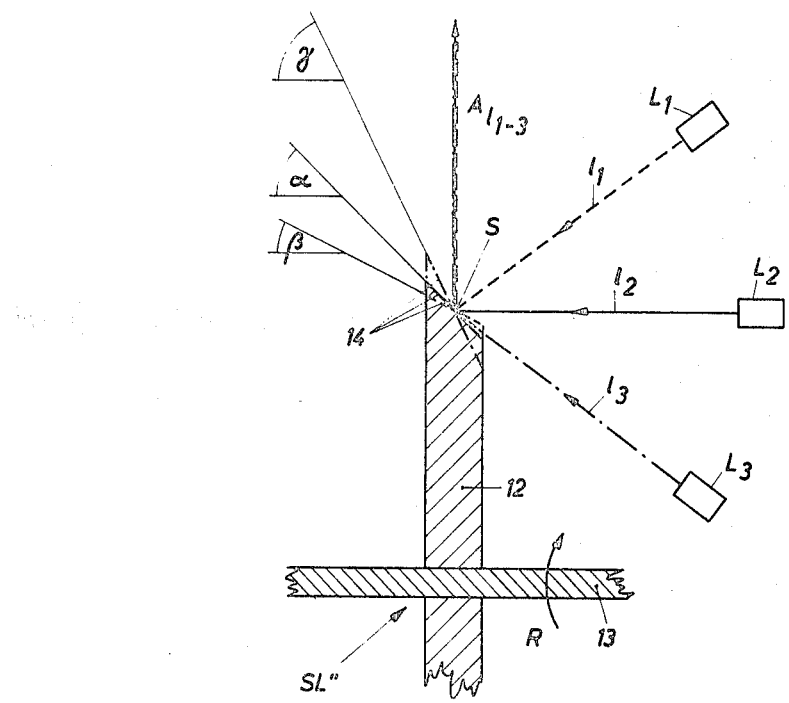
FIG. 8 is a partial view of a modified structure.

The example of construction according to FIG. 8 is provided with three light amplifying units $L_1$, $L_2$ and $L_3$ which direct their single beams $l_1$, $l_2$ and $l_3$ through a common point S. Here the control device of beams SL'' consists of a disk 12 which can be moved by driving means in the direction of the arrow R around an axis 13. Surfaces of reflection 14 are arranged at intervals along the periphery of the disk, said surfaces being inclined variably with respect to the main surface of the disk 12. The variable inclination angles are shown to be $\alpha$, $\beta$ and $\gamma$. The surfaces of reflection pass through the center point S during rotation of the disk 12. The inclination angle of the surfaces of reflection are synchronized in the entrance direction of the single beams of light $l_{1-3}$ so that they leave the apparatus together in the output beam $A_{1_{1-3}}$. The sequence of surfaces of reflection 14 and the rotation member of the disk 12 are synchronized with the pulse frequency of the single beams of light so that a pulse sequence of the alternately pulsed single pulses occurs in the output beam.

Figure 9:
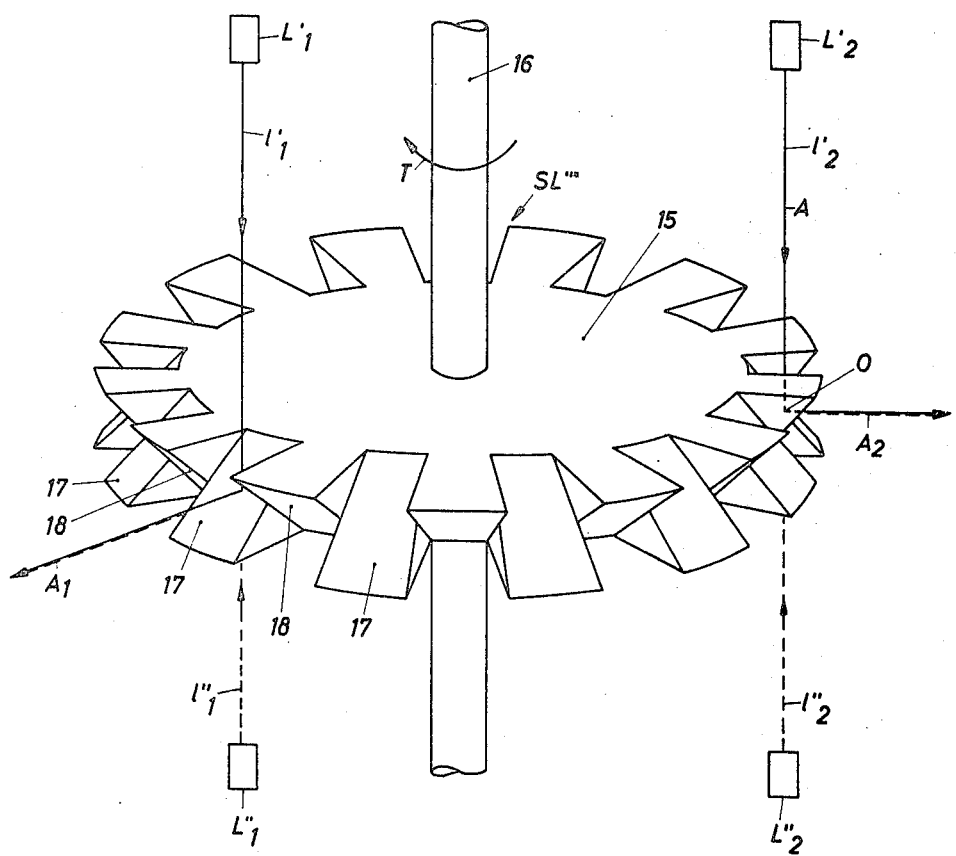
FIG. 9 is a perspective view of a second embodiment comprising two output beams.

Finally, the construction of FIG. 9 is provided with two light amplifying units $L'_1$, $L''_1$ together with $L_2'$, $L_2''$, each pair being coaxial and arranged to each other so that their single beams of light $l_1'$ and $l_1''$ and $l_2'$ and $l_2''$ are traveling in the same path opposed to each other. Here the control device of beam $SL'''$ consists of a disk 15 which is rotatable around an axis 16 in the direction of the arrow T. At the periphery of said disk, the surfaces of reflection 17 and 18 are arranged in a tooth-like fashion offset and with opposed inclinations to each other. The number of rotations of the disk 15 is synchronized with the pulse frequency of the single beams of light so that the said single beams of light of correlating light amplifying units leave the apparatus radially to the disk in one common output beam $A_1$ or $A_2$.

This invention is not restricted to said shown examples of construction. For simplifying purposes it would be possible to provide the beam controlling device with only one reflective surface which rotates around an axis. This reflective surface is inclined at an angle of 45 degrees relative to the plane in which the light amplifying units are so arranged that they direct their pulses toward the point of intersection between the reflective surface and its axis of rotation so that these pulses are all reflected in one direction. Furthermore, instead of using rotatable reflective surfaces for the single light beams, a reflective surface which oscillates to and fro can be used. The reflective surfaces can be replaced as desired by other optical reflection elements namely prisms and wedges. Furthermore, the light amplifying units used can be of such number as the number of output beams being produced by a group of light amplifying units.

All characteristics shown by the drawings and described in the description including the constructive details can be of importance for the invention in any desired combination.

The embodiments of the invention in which an exclusive property or privilege is claimed are defined as follows:

1. Apparatus for producing a coherent monochromatic light in one common output beam, comprising:
   at least two lasers, each of said lasers generating a pulsed output light in a sequential pattern, the light path of one of said lasers transversely intersecting said common output beam;
   a control device having a light deflector and moving means for continuously moving said light deflector within a first zone and into a second zone, said deflector including a light reflecting face, said light reflecting face during said movement describing a single surface, said light reflecting face lying wholly in said surface during movement of said deflector within said first zone, the axes of said output beam and of the light paths of said two lasers defining and lying in a common plane, said plane being perpendicular to a line tangent to said surface, said axes of said common beam and of the light path of one of said lasers intersecting at a point located in said surface, on said line, and in said first zone, the axes of said common beam and said one laser defining equal angles in said plane with said surface, said reflective face lying in said light path of said one laser while said light deflector is in said first zone so that said output light of said one laser is deflected by said reflecting face along said axis of said common beam despite said movement of said light deflector within said first zone, said deflector when in said first zone preventing communication between the light path of said other laser of said common output beam;
   means for causing said output light of said other laser to contribute to said common beam when said light deflector is in said second zone, said reflecting face being out of the light path of said one laser when said deflector is in said second zone so that light from said one laser is not deflected into said common beam;
   means for synchronizing the movement of said moving means between said first and second zones with the output light pulses from each of said lasers to supply a coherent monochromatic light to said common output beam;
   whereby the light output of both lasers contributes to said common beam and the contribution of said one laser is unaffected by substantial movement of said deflector within said first zone.

2. Apparatus according to claim 1, wherein said reflecting face is flat and is supported for movement along its plane.

3. Apparatus according to claim 1, wherein the reflecting face is a portion of a body of revolution and is supported for rotation around the axis of the body of revolution.

4. Apparatus according to claim 3, wherein the reflecting surface is part of a conical surface.

5. Apparatus according to claim 3, including, in addition to said pair of lasers, a plurality of lasers; and
   wherein all of the lasers except one are arranged so that their output light travels in planes transverse of the direction of the output beam and wherein the control device consists of a number of deflectors each having a reflecting face; and
   wherein said means for moving moves said deflectors for rotation with said reflective faces passing through the axis of the common output beam and the respective light paths of all but one of said lasers during such rotation.

6. Apparatus according to claim 5, wherein the lasers and the axes of rotation of the deflectors are arranged in a helix around the axis of the common output beam.

7. Apparatus according to claim 1, wherein the light paths of the lasers intersect at a common focal point and wherein the control device is a disk supported for rotation, said means for moving rotating said disk, said disk being provided at its periphery with reflective faces differentially inclined towards the axis of rotation thereof, each of the reflective faces passing through said focal point during rotation of the disk.

8. Apparatus according to claim 1, wherein said two lasers are arranged so that their respective output lights are oppositely directed with respect to each other and wherein the control device consists of a rotatably driven disk having a plurality of teeth on the peripheral edge thereof, each of said teeth having reflective faces alternately inclined with respect to the axis of rotation of the disk, said reflective faces passing through the paths of output light during rotation of the disk.

9. Apparatus for producing a coherent monochromatic light in one common output beam, comprising:
   at least two lasers, each of said lasers generating a pulsed output light in a sequential pattern, the light paths of said lasers transversely intersecting the axis of said common output beam at points spaced along said axis;
   at least two control devices spaced along said common output beam, each said control device being associated with one of said lasers, each said control device having a light deflector and moving means for continuously moving said light deflector within a first zone and into a second zone, said first zone being the region of said common output beam and said second zone being the region outside the first zone, said deflector including a light reflecting face, said light reflecting face during said movement describing a single surface, said light reflecting face lying wholly in said surface during movement of said deflector within said first zone, the axes of said common output beam and the light path of the respective one of said lasers intersecting at a point in said surface and in said first zone, said reflecting face lying in said light path of said respective one of said lasers while said light deflector is in said first zone so that said output light of said resective one of said lasers is deflected by said reflecting face along said axis of said common beam despite said movement of said light deflector within said first zone, said reflecting face being out of the light path of said one laser when said deflector is in said second zone so that light from said respective one of said lasers is not deflected into said common beam;

means for synchronizing the movement of said moving means between said first and second zones with the output light pulses from each of said lasers to supply a coherent monochromatic light to said common output beam, said deflectors being arranged on said control devices for occupying said first zone one at a time whereby the output lights of said pair of lasers are deflected along the axis of said common output beam one after the other.

References Cited
UNITED STATES PATENTS

| 3,292,102 | 12/1966 | Byrne | 331—94.5 |
| 3,389,348 | 6/1968 | De Maria | 331—94.5 |
| 3,310,753 | 3/1967 | Burkhalter | 331—94.5 |
| 3,311,844 | 3/1967 | Curcio | 331—94.5 |

OTHER REFERENCES

Wolf, Gatling-Gun Laser Novel Approach to Optical Radar, Electronics, vol. 36, No. 38, Sept. 20, 1963, pp. 25–29.

WILLIAM L. SIKES, Primary Examiner

U.S. Cl. X.R.

350—266, 299